United States Patent Office 3,780,074
Patented Dec. 18, 1973

3,780,074
PREPARATION OF ALKADIENOIC ACID ESTERS
Michael G. Romanelli, New York, N.Y., assignor to Esso Research and Engineering Company
No Drawing. Continuation-in-part of applications Ser. No. 808,672 and Ser. No. 808,673, both Mar. 19, 1969, now Patents Nos. 3,670,029 and 3,670,032 respectively. This application June 3, 1971, Ser. No. 149,774
Int. Cl. C07c 67/00, 69/52
U.S. Cl. 260—410.9 R    12 Claims

ABSTRACT OF THE DISCLOSURE

Esters of alkadienoic acids are prepared through the reaction of $C_4$–$C_{12}$ aliphatic, acyclic, conjugated diolefins with a $C_1$–$C_{20}$ monohydroxy alcohol and either gaseous carbon monoxide or gases containing carbon monoxide in the presence of a catalyst system including zerovalent palladium. A preferred catalyst system is comprised of a zerovalent palladium material and a phosphine activator. The reaction is conducted at moderate temperature and pressure conditions. The alkadienoic acid esters and their hydrogenated derivatives are useful as solvents, brake fluids and plasticizers.

CROSS-REFERENCE TO RELATED APPLICATIONS

This application is a continuation-in-part of copending applications: Ser. No. 808,672 filed Mar. 19, 1969, now U.S. 3,670,029 and Ser. No. 808,673 filed Mar. 19, 1969, now U.S. 3,670,032.

BACKGROUND OF THE INVENTION

Field of the invention

This invention relates to a process for the formation of novel alkadienoic acid esters. More particularly the invention relates to a method for securing alkadienoic acid esters through the liquid phase reaction of aliphatic, acyclic, conjugated diolefins with a monohydroxy alcohol and carbon monoxide in the presence of a catalyst based upon zerovalent palladium. The overall reaction involves dimerization of the conjugated diolefin and the addition of both carbon monoxide and an alcohol to the diolefin dimer to give the ester of an alkadienoic acid.

Description of the prior art

The reaction of butadiene with methanol, ethanol, isopropanol, etc., in the presence of bis(triphenylphosphine) palladium maleic anhydride and other palladium catalysts such as palladium chloride to form unsaturated ether materials has been reported by S. Takahashi et al., Tetrahedron Letters, No. 26, pages 2451–2453 (1967). Also, Tsuji in Organic Snythesis by Noble Metal Compounds, reports that conjugated dienes when treated with palladium chloride from beta,gamma-unsaturated esters but without a concomitant dimerization of the conjugated diolefins. The prior art also discloses processes for the formation of carboxylic acids and carboxylic acid esters through carbonylation of dienes (see e.g. U.S. 3,437,676 and U.S. 3,501,518). Other workers have disclosed processes for making $C_9$ acids by first making the ester (see U.S. 2,640,-074). Finally, a process for forming $C_5$ esters through olefin carbonylation has been reported (see U.S. 2,868,813), however, no butadiene dimerization occurs as is true for most of the prior art processes with the result that a monoolefin having $n$ carbons yields a carboxylic acid ester having $n+1$ carbons.

SUMMARY OF THE INVENTION

Now in accordance with the present invention, it has unexpectedly been discovered that esters of alkadienoic acids can be selectively synthesized through a process which includes the catalyzed dimerization of conjugated aliphatic diolefins followed by the carbonylation and esterification of the resulting dimer the resulting alkadienoic acid ester therefore has $2n$ plus 1 carbons where $n$ is the carbon number of the conjugated diolefin reagent. The reaction is conducted in a liquid phase using a homogeneous reaction system. The process is normally carried out at temperatures of from about 80° C. to about 160° C. with carbon monoxide pressures ranging from atmospheric to superatmospheric in the substantial absence of oxygen. The catalyst system used to promote the reaction comprises a material that will provide a source of zerovalent palladium at reaction conditions together with a phosphine activator or extraenous amounts of said activator may be added.

The reaction for the formation of the alkadienoic acid esters, it is believed, proceeds in a manner illustrated by the following equation:

(1)

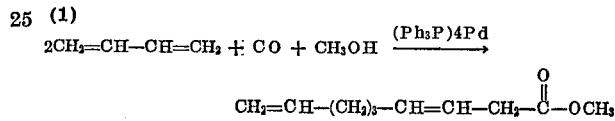

Equation 1 demonstrates the reaction of 2 moles of butdiene with a monohydroxyl alcohol such as methanol and gaseous carbon monoxide in the presence of tetrakis (triphenylphosphine)palladium to form the resulting esterified, carboxylated dimer, i.e. methyl trans 3,8-nonadienoate and may be referred to as the methyl ester of nonadienoic acid, a $C_9$ diene acid. The reaction product is generally composed of greater than about 30 wt. percent of the ester of the corresponding nonadienoic acid product.

The starting diolefinic reagent is preferably a $C_4$–$C_{12}$ acyclic, conjugated aliphatic hydrocarbon diolefin including substituted hydrocarbyl moieties. More preferably, however, the aliphatic hydrocarbon diolefins are $C_4$–$C_6$ acyclic conjugated dienes and most preferebly are unsubstituted materials such as butadiene, isoprene, and piperylene. Other non-limiting representative examples of useful starting diolefins includes 2,3-dimethylbutadiene, chloroprene and 2-cyano-1,3-butadiene, 2,3-di-n-butyl-1,3-butadiene and the like.

The monohydroxy alcohols to be employed as coreactants have the general formula ROH. The symbols R of the general formula designates a monovalent acyclic or alicyclic organic radical including alkyls having from 1 to 20, preferably 1 to 12 carbon atoms; and aralkyls having from 7 to 12 carbon atoms. Representative non-limiting examples of useful alcohols include methanol, ethanol, n-propanol, lauryl alcohol, n-hexadecylalcohol, isopropylalcohol, secondary butylalcohol, neopentylalcohol, cyclohexanol, benzylalcohol, phenylethylalcohol.

Pure carbon monoxide may be used but it is also possible to employ either commercial gas containing, in addition to carbon monoxide, various constituents such as saturated hydrocarbon or nitrogen, or mixtures of hydrogen and carbon monoxide, i.e. "synthesis gas." Carbon monoxide pressures may vary from atmospheric to up to as high as 4,000 p.s.i. The preferred range is from 1,000 to 3,000 p.s.i. and the most preferred is from 1500 to 2500 p.s.i. pressure of carbon monoxide.

The reaction for the formation of the alkadienoic acid esters can be carried out in the absence of a solvent or in the presence of an organic diluent that is a substantially inert solvent. It is preferred that the reaction be conducted in a homogeneous reaction system. In most instances the desired homogeneous system can be obtained without the use of solvent systems since the diolefins are usually readily soluble in the monohydroxy alcohol coreactant to which is added the gaseous carbon monoxide. While solvents are not mandatory, representative examples of useful solvent materials include $C_3$ to $C_{12}$ aliphatic ethers and $C_5$ to $C_{10}$ aliphatic and aromatic hydrocarbons, such as pentane, hexane, benzene, toluene, xylene, ethylbenzene, tetrahydrofuran, dimethoxymethane and dioxane.

The catalyst system used to promote the formation of the alkadienoic acid esters is composed of a zerovalent palladium material. This is a zerovalent palladium material or a compound or complex that will yield zerovalent palladium under reaction conditions such as bis-(pi-allyl) palladium. Palladium chloride or complexes of divalent palladium with a suitable reductant such as sodium borohydride or hydrazine will also suffice. Other examples of zerovalent palladium materials are compounds or complexes represented by the general formula $L_4Pd$ wherein L is a phosphine ligand of the type $R_1R_2R_3P$ and in which the R groups are each independently selected from the group consisting of monovalent acyclic or alicyclic alkyl radicals having from 1 to 20, preferably 1 to 8, carbon atoms; phenyl radicals; monovalent alkylaryl radicals having from 7 to 12, preferably 7 to 10, carbon atoms; and monovalent aralkyl radicals having from 7 to 12, preferably 7 to 10, carbon atoms. Representative examples of useful ligand materials include triphenylphosphine, tribenzylphosphine, tributylphosphine, trioctylphosphine, diethylphenylphoshine, diphenylcyclohexylphosphine, diphenyldodecylphosphine, diphenyl-s-butylphosphine, etc. Palladium materials that will generate the desired zerovalent palladium under reaction conditions include materials such as tetrakis(triphenylphosphine)palladium, tetrakis(tribenzylphosphine)palladium, tetrakis(trioctylphosphine)palladium, bis(pi-allyl)palladium and palladium acetate, palladium chloride or complexes of divalent palladium with sodium borohydride, hydrazine or other suitable reductants. These catalysts are sensitive to oxygen and mineral acids; hence maximum catalyst efficiency is secured by purification of the reactants prior to use. Oxygen removal can be secured by purging the reaction system with nitrogen or other inert gases. The substantial absence of mineral acids can be insured by the extraneous addition of a base.

Organic phosphine compounds are to be employed in conjunction with the zerovalent palladium catalyst as catalyst activators. They may be already contained as part of the zerovalent palladium material, or they may be added extraneously to said material. Useful materials can be represented by the general formula $R_1R_2R_3P$ wherein $R_1$, $R_2$ and $R_3$ are monovalent organic radicals having from 1 to 20, preferably 1 to 8, carbon atoms. Most preferably $R_1$, $R_2$ and $R_3$ are monovalent acyclic or alicyclic alkyl radicals having from 1 to 8, preferably 1 to 6, carbon atoms; phenyl radicals, monovalent alkylaryl radicals having from 7 to 12, preferably from 7 to 10, carbon atoms; and monovalent aralkyl radicals having from 7 to 12, preferably 7 to 10, carbon atoms. Examples of useful activator materials include triphenylphosphine, tribenzylphosphine, tributylphosphine, trioctylphosphine, diethylphenylphosphine, tricyclohexylphosphine, diphenylcyclohexylphosphine, diphenyldodecylphosphine, diphenyl-s-butylphosphine, etc. These catalyst activators may be part of the catalyst, for example the use of tetrakis(triphenylphosphine)palladium in the reaction generates in situ, the zerovalent palladium material together with the catalyst activator triphenylphosphine. These catalyst activators may also be added extraneously where they are not part of the initial catalyst material or even where part of the original catalyst material since their addition in some instances tends to increase reactivity and selectivity to the final product.

The reaction for the formation of the alkadienoic acid esters is carried out under reaction conditions which include contacting the reactants in the liquid phase and at temperatures which range from about 80° C.–60° C., more preferably 90° C.–150° C., and most preferred from 100° C.–140° C. The reaction pressure, as was noted before, may range from atmospheric up to 4,000 p.s.i. of carbon monoxide pressure, the most preferred range being from 1,500–2,500 p.s.i. The length of time that the reaction takes depends upon a number of process variables, and it would be well within the common knowledge of one skilled in the art to monitor the rate of the reaction by such techniques as gas chromatography to determine the percentage of product formed. Typically, substantial yields containing upwards of 80% of the ester, are secured within ten to twenty hours for reactions conducted at temperatures between 100° C. and 140° C.

In a typical reaction procedure, the catalyst and diolefin are dissolved in an alcohol solution—for example, butadiene together with the palladium catalyst and activator is dissolved in a methanol solution to which is added gaseous carbon monoxide at varying pressures. The reactor is heated by means of a heating bath or element up to the temperatures between 100° C. and 140° C. The catalyst comprised of zerovalent palladium material causes the selective dimerization of the butadiene and allows both the carbon monoxide and methanol to add to the resulting dimer to yield the methyl trans 3,8-nonadienoate as the predominant product.

The novel products produced by the present process have many uses. For example, the product of the butadiene carbonylation dimerization reaction yields a product which may be hydrogenated using conventional means to give methyl pelargonate—a compound useful in making pelargonic acid for the synthesis of brake fluid, surfactants, etc.; also it may be further hydrolyzed to the form nonanol which is useful for the synthesis of plasticizers, cosmetic oils, etc.

DESCRIPTION OF THE PREFERRED EMBODIMENTS

The present invention is further illustrated by reference to the following non-limiting examples:

Example 1

Into a stainless steel pressure bomb equipped with a glass liner is placed 0.8503 g. tetrakis(triphenylphosphine)-palladium, 320 ml. $CH_3OH$ and 110.5 g. butadiene, under nitrogen. The bomb is pressurized to 2,000 p.s.i.g. with carbon monoxide then heated at 100° C. for 20 hours. At the end of that time, the reactor is cooled and vented and the contents are poured into 300 ml. of water and extracted with 100 ml. pentane. The pentane layer is separated, dried over $MgSO_4$ and the pentane then stripped off. There is obtained 3.05 g. product containing 63.3% methyl trans 3,8-nonadienoate as determined by carbon-hydrogen analysis together with NMR and IR and G.C. These determinations are as follows:

(1) Carbon-hydrogen analysis.—Found (percent): C, 72.15; H, 9.78. Calculated (percent): C, 71.39; H, 9.59.

(2) NMR: 60 cm. in $CDCl_3$ $$\underset{Ha}{CH_2=CH}-(CH_2)_3\underset{Hd}{CH}=\underset{Ha}{CH}-\underset{Hc}{CH_2}-\overset{O}{\underset{\|}{C}}-\underset{Hb}{OCH_3}$$

| Assignment | No. of H's | δ (p.p.m. from TMS) |
|---|---|---|
| Ha | 5 | 5.5 (center of complex multiplet). |
| Hb | 3 | 3.6 (singlet). |
| Hc | 2 | 3.0 (multiplet). |
| Hd | 6 | 1.8 (center of complex multiplet). |

(2) I.R. analysis:

| Assignment | γ (cm.⁻¹) |
|---|---|
|  | |
| —C(=O)—O— | 1,730 |
| —C=C— | 1,630 |
| —C=CH₂ | 905, 990 |
| H\C=C/  (Trans) /  \H | 965 |

(4) Gas chromatography: Conditions: 70 ml./min. helium, silicon rubber column, 30% SE–30 on 60/80 chromosorb W; ¼" x 5 foot; "on column" injection; 50° C. for 20.0 minutes then program to 200° C. at 6°/minute. Product retention time 34 minutes. Finally, hydrogenation of the product and comparison with authenticated sample of methyl pelargonate verifies product as identified above.

This example shows the high yields of the nonadienoate ester obtained with the process. (Note: all percents are weight percents.)

Example 2

Following the general procedure of Example 1, a series of reactions were run in which various catalyst activators, L, were added to tetrakis(triphenylphosphine)palladium. The results are summarized in Table I and show that the addition of various catalyst activators can reduce the overall time required for reaction while increasing yields of the nonadienoate ester in the product. Compare for example Run 1 with Runs 4–6, 10, 12, 13, etc.

TABLE I

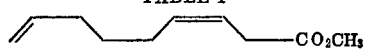
—CO₂CH₃

| Run number | (Ph₃P)₄Pd (g.) | L | L (g.) | Time (hours) | Product (g.) | Percent |
|---|---|---|---|---|---|---|
| 1 | 0.8503 | | | 20 | 3.05 | 63.3 |
| 2 | 0.8208 | Ph₃P | 0.9320 | 15 | 2.85 | 42.7 |
| 3 | 0.8268 | Ph₃P | 2.82 | 15 | 2.25 | 5.1 |
| 4 | 0.8188 | (n-C₄H₉)₃P | 0.560 | 15 | 7.00 | 73.6 |
| 5 | 0.8204 | (n-C₄H₉)₃P | 1.4258 | 15 | 10.85 | 71.2 |
| 6 | 0.8276 | (n-C₄H₉)₃P | 2.1732 | 15 | 7.45 | 64.4 |
| 7 | 0.8237 | (n-C₄H₉)₃P | 2.9836 | 15 | 4.15 | 52.1 |
| 8 | 0.8236 | (n-C₄H₉)₃P | 4.3033 | 15 | 2.85 | 24.5 |
| 9 | 0.8274 | (n-C₄H₉)₃P | 7.2589 | 15 | 1.74 | 2.0 |
| 10 | 0.8279 | Ph₂P—CH₃ | 0.7160 | 15 | 7.55 | 64.9 |
| 11 | 0.8174 | Ph₂P—CH₃ | 1.4349 | 15 | 3.24 | 46.4 |
| 12 | 0.8268 | PhP—(C₂H₅)₂ | 0.3599 | 15 | 8.85 | 74.0 |
| 13 | 0.8266 | PhP(C₂H₅)₂ | 0.5967 | 15 | 10.50 | 76.3 |
| 14 | 0.8157 | PhP(C₂H₅)₂ | 1.1410 | 15 | 5.50 | 63.0 |
| 15 | 0.8225 | PhP(C₂H₅)₂ | 1.1840 | 15 | 5.20 | 67.0 |
| 16 | 0.8261 | PhP(C₂H₅)₂ | 1.7777 | 15 | 3.00 | 38.3 |
| 17 | 0.8269 | (C₆H₁₁)₃P | 1.0040 | 15 | 12.95 | 19.1 |
| 18 | 0.8242 | Same | 1.9914 | 15 | 2.65 | 56.0 |
| 19 | 0.8250 | (C₂H₅O)₃P | 0.5964 | 15 | 1.95 | 19.31 |
| 20 | 0.8292 | (C₂H₅O)₃P | 1.1971 | 15 | 1.50 | 1.70 |

Example 3

Following the general procedure of Example 1, a series of reactions were run in which the catalyst was tetrakis(tri-n-butylphosphine)palladium to which additional catalyst activator (n-C₄H₉)₃P was added. The results are found in Table II and show that in some instances the addition of substantial, extraneous amounts of activator is not essential where the catalyst is comprised of both the zerovalent palladium material and catalyst activator which are generated in situ during the course of the reaction; e.g. compare Runs 1 and 3. The addition of smaller amounts can however increase the yield of desired product; e.g. compare Runs 1 and 2.

TABLE II

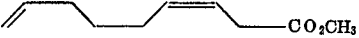
—CO₂CH₃

| Run No. | [(nC₄H₉)₃P]₄Pd (g.) | (n-C₄H₉)₃P (g.) | Time (hours) | Product (g.) | Percent |
|---|---|---|---|---|---|
| 1 | 0.8161 | | 15 | 10.10 | 81.9 |
| 2 | 0.8266 | 0.9097 | 15 | 14.25 | 80.5 |
| 3 | 0.8188 | 1.8295 | 15 | 7.81 | 60.6 |

Example 4

Following the general procedure of Example 1, a series of reactions were run at various temperatures using tetrakis(triphenylphosphine)palladium as the catalyst and tri-n-butylphosphine as an additional catalyst activator. The results are summarized in Table III and show the effect that temperature has on the overall yield of ester product. Comparison of Runs 1, 2 and 3 as found in this table show that as the temperature is increased above 100° C. the yields of ester product decrease.

TABLE III

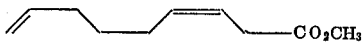
—CO₂CH₃

| Run No. | (Ph₃P)₄Pd (g.) | (n-C₄H₉)₃P (g.) | T., °C. | Time (hours) | Product (g.) | Percent |
|---|---|---|---|---|---|---|
| 1 | 0.8204 | 1.4258 | 100 | 15 | 10.85 | 71.2 |
| 2 | 0.8303 | 1.4544 | 120 | 15 | 21.15 | 64.3 |
| 3 | 0.8303 | 1.4428 | 140 | 15 | 19.11 | 40.8 |

Example 5

Following the general procedure of Example 1, a series of reactions were run at various CO pressures using tetrakis(triphenylphosphine)palladium as the catalyst and tri-n-butylphosphine as an additional catalyst activator. These results can be found in Table IV and show the effect of operating the process at various carbon monoxide pressures. Comparing Runs 1, 2 and 3, it can be seen that the optimum carbon monoxide pressure is 2,000 p.s.i.

TABLE IV

—CO₂CH₃

| Run number | (Ph₃P)₄Pd (g.) | (n-C₄H₉)₃P (g.) | CO, p.s.i.g. | T., °C. | Time (hours) | Product (g.) | Percent |
|---|---|---|---|---|---|---|---|
| 1 | 0.7177 | 1.2646 | 1,000 | 120 | 15 | 12.53 | 61.8 |
| 2 | 0.8303 | 1.4544 | 2,000 | 120 | 15 | 21.15 | 64.3 |
| 3 | 0.8435 | 1.4785 | 3,000 | 120 | 15 | 10.05 | 43.3 |

Example 6

Following the general procedure of Example 1, a series of reactions were run in which 50 vol. percent of the methanol was replaced with another solvent. The catalyst was tetrakis(triphenylphosphine)palladium and tri-n-butylphosphine was added as an additional catalyst activator. The results of these runs are found summarized in Table V and show the preferred reaction system for the process to be a homogeneous one with one of the coreactants, in this case methanol, acting as solvent for the process. Compare Run 1 with Runs 2 and 3.

TABLE V

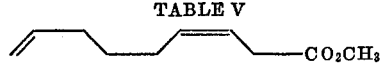—$CO_2CH_3$

| Run number | $(Ph_3P)_4Pd$ (g.) | $((n-C_4H_9)_3P$ (g.) | Added solvent | T., °C. | Time (hours) | Product (g.) | Percent |
|---|---|---|---|---|---|---|---|
| 1 | 0.8303 | 1.4544 | | 120 | 15 | 21.15 | 64.3 |
| 2 | 0.8284 | 1.4567 | $C_6H_6$ | 120 | 15 | 6.25 | 43.0 |
| 3 | 0.8362 | 1.4728 | THF | 120 | 15 | 11.41 | 8.5 |

Example 7

Following the general procedure of Example 1, a series of reactions were run in which the effect of a halogen i.e., iodine, were investigated. The catalyst was tetrakis(triphenylphosphine)palladium with additional tri-n-butylphosphine added. The results of these reactions are summarized in Table VI and illustrate that addition of halogen such as iodine has little effect on the overall yield of ester product.

TABLE VI

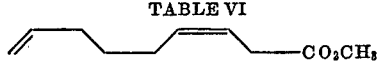—$CO_2CH_3$

| Run number | $(Ph_3P)_4Pd$ (g.) | $(n-C_4H_9)_3P$ (g.) | $I_2$ (g.) | T., °C. | Time (hours) | Product (g.) | Percent |
|---|---|---|---|---|---|---|---|
| 1 | 0.8303 | 1.4544 | | 120 | 15 | 21.15 | 64.3 |
| 2 | 0.8221 | 1.4414 | 0.0906 | 120 | 15 | 21.43 | 59.8 |
| 3 | 0.8345 | 1.4779 | 0.1888 | 120 | 15 | 16.8 | 61.6 |

Example 8

Following the general procedure of Example 1, 117.3 g. butadiene and 320 ml. methanol were reacted at 100° C. for 15 hours with 2,000 p.s.i. of a 1:1 carbon monoxide - hydrogen gas mixture and 0.8330 g. of a tetrakis(tri-n-octylphosphine)palladium catalyst. There was obtained 7.90 g. product containing 73.7% of methyl trans-3,8-nonadienoate. This example shows high yields of ester product are obtainable when "synthesis gas" is employed as the carbon monoxide reactant.

What is claimed is:

1. A process for the production of alkadienoic acid esters which comprises contacting a $C_4$ to $C_{12}$ acyclic conjugated aliphatic diolefin with a $C_1$ to $C_{20}$ monohydroxy alcohol and a source of gaseous carbon monoxide in the presence of a zerovalent palladium catalyst material selected from the group consisting of tetrakis(triphenylphosphine) palladium, tetrakis(tribenzylphosphine) palladium and tetrakis(trioctylphosphine) palladium and a phosphine activator at reaction conditions and recovering the corresponding alkyl alkadienoate having 2n plus 1 carbon atom where n is the carbon number of said diolefin.

2. The process of claim 1 wherein said contacting is carried out at a temperature ranging from about 80° to about 160° C.

3. The process of claim 2 wherein said monohydroxy alcohol has the general formula ROH, where R is a monovalent organic radical selected from the group consisting of alkyl radicals having from 1 to 20 carbon atoms, and monovalent aralkyl radicals having from 7 to 12 carbon atoms.

4. The process of claim 3 wherein said phosphine activator is an organic phosphine compound having the general formula $R_1R_2R_3P$ where $R_1$, $R_2$ and $R_3$ are monovalent organic radicals selected from the group consisting of alkyl radicals having from 1 to 20 carbon atoms; phenyl radicals; aralkyl and alkylaryl radicals having from 7 to 12 carbon atoms.

5. The process of claim 4 wherein said zerovalent palladium catalyst material has the general formula:

$$L_4Pd$$

wherein L is a ligand of the type $R_1R_2R_3P$ in which $R_1$, $R_2$ and $R_3$ are selected from the group consisting of monovalent alkyl radicals having from 1 to 20 carbon atoms; phenyl radicals; monovalent alkylaryl radicals having from 7 to 12 carbon atoms and monovalent aralkyl radicals having from 7 to 12 carbon atoms.

6. The process of claim 1 wherein said contacting is conducted with carbon monoxide pressures varying between about 1,000 p.s.i. and 4,000 p.s.i.

7. The process of claim 6 wherein said diolefin is selected from the group consisting of butadiene, isoprene and piperylene.

8. A process for the production of esters of nonadienoic acid which comprises contacting butadiene with monohydroxy alkanols having from 1 to 12 carbon atoms and carbon monoxide in the presence of a zerovalent palladium catalyst material selected from the group consisting of tetrakis(triphenylphosphine)palladium, tetrakis(tribenzylphosphine)palladium and tetrakis(trioctylphosphine)palladium and an organic phosphine activator at temperatures of from about 90 to about 150° C. for a time sufficient to recover a yield of the corresponding nonadienoate.

9. The process of claim 8 wherein said zerovalent palladium material is tetrakis(triphenylphosphine)palladium and said organic phosphine activator is selected from the group consisting of triphenylphosphine, tribenzylphosphine, tributylphosphine, trioctylphosphine, diethylphenylphosphine, diphenylmethylphosphine, tricyclohexylphosphine and triethylphosphine.

10. The process of claim 8 wherein said monohydroxy alkanol is methanol and the contacting is carried out at carbon monoxide pressures of from about 1,500 p.s.i. to about 2,500 p.s.i.

11. The process of claim 1 wherein said zerovalent palladium catalyst material is tetrakis(triphenylphosphine) palladium and said phosphine activator is tributylphosphine.

12. The process of claim 8 wherein said zerovalent palladium catalyst material is tetrakis(triphenylphosphine)palladium and said organic phosphine activator is tributylphosphine.

References Cited

UNITED STATES PATENTS

| | | | |
|---|---|---|---|
| 2,640,074 | 5/1953 | Gresham et al. | 260—486 R |
| 3,536,739 | 10/1970 | Scheben | 260—408 |

FOREIGN PATENTS

| | | |
|---|---|---|
| 28,970 | 9/1970 | Japan. |

OTHER REFERENCES

Chemical Abstracts, vol. 68, 104488k (1968).

Billups et al.: The Palladium-Catalyzed Carbonylation Dimerization of Butadiene," J. Chem. Soc. (D), No. 18, pp. 1067–8, Sept. 22, 1971.

LEWIS GOTTS, Primary Examiner

D. G. RIVERS, Assistant Examiner

U.S. Cl. X.R.

260—404, 408, 410, 410.5, 31.2 R; 252—56 S